June 28, 1960         J. L. EDELEN         2,942,732
DISPOSABLE VENTED FUEL FILTER
Filed July 16, 1956                    2 Sheets-Sheet 1

INVENTOR.
JAMES L. EDELEN
BY
Bertram H. Mann
ATTORNEY

June 28, 1960   J. L. EDELEN   2,942,732
DISPOSABLE VENTED FUEL FILTER
Filed July 16, 1956   2 Sheets-Sheet 2

INVENTOR.
JAMES L. EDELEN
BY
Bertram H. Mann
ATTORNEY

United States Patent Office 2,942,732
Patented June 28, 1960

2,942,732

DISPOSABLE VENTED FUEL FILTER

James L. Edelen, Kirkwood, Mo., assignor to ACF Industries, Incorporated, St. Louis, Mo., a corporation of New Jersey Filed July 16, 1956, Ser. No. 598,147

3 Claims. (Cl. 210—436)

This invention relates to filters and more particularly to a filter device adapted to be interposed in a fuel system between a fuel pump and a carburetor of an internal combustion engine to remove solid foreign particles and vapor gases from liquid fuel to insure proper operation of the engine.

During hot weather, gasoline within an automobile fuel system becomes heated and generates vapor gases which may prevent a proper flow of bubble-free gasoline from the pump into the carburetor.

It is, therefore, an object of the invention to provide a fuel system embodying means to transfer vapor gases from the system back to the fuel tank to thus maintain a continuous flow of bubble-free gasoline from the pump into the carburetor during operation of the engine.

Another object of the invention resides in the provision of a filter device adapted to be interposed in a fuel system between a pump and a carburetor to separate vapor gases from the liquid fuel and then to vent such gases back to the fuel tank.

A further object of the invention resides in the provision of a fuel system embodying a filter device having a restricted orifice through which vapor gases and/or liquid fuel is continuously transferred back to the fuel tank during operation of the engine and its fuel pump.

Another object of the invention resides in the provision of a filter device in which a filter element is mounted adjacent the lower portion of a relatively large housing to provide a large chamber above the filter element to receive liquid fuel and any vapor gases separated therefrom by the filter element, such gases and/or a relatively small quantity of liquid fuel being continuously transferred from said chamber through a restricted orifice and conduit back to the fuel tank, while bubble-free liquid fuel is being continuously forced through the filter element to the carburetor by means of the pump.

It is another object of the invention to provide a filter device in which an inexpensive filter element is permanently enclosed within a relatively simple, inexpensive housing of tin can construction comprising a tubular side wall closed at its ends by disk-shaped end walls, the side and end walls being joined together by conventional single or double lap joints or seams, and the end walls being provided with threaded inlet and outlet fittings to be detachably connected to their respective fuel conduits. By thus providing a filter device of relatively inexpensive construction, it is economically feasible to discard the device after a predetermined period of service and replace same by a new filter device to insure efficient filtering of the fuel and satisfactory operation of the engine.

Another object of the invention resides in the provision of a filter housing of generally tin can construction embodying an inner partion joined to the side wall and adjacent end wall by a conventional lap joint or seam, the inner partion being formed to provide a seat for one end of the filter element, the other end of the filter element being engaged by a compression spring seated on the filter inlet fitting.

Another object of the invention resides in the provision of a filter element comprising two strips of embossed sheet filter material, such as treated paper, spirally wound and closed along their ends and side edges to define two spiral passages each having but one opening, whereby fuel flowing through one opening into one of said passages must filter through the embossed strips into the other passage before being discharged from the other opening.

Another object of the invention resides in the provision of a filter element in which the embossments on the strips serve to space the two strips from each other when the strips are spirally wound to define two passages, the embossments also serving to increase the filter area of the strips.

The invention embodies other novel features, details of construction and arrangement of parts which are hereinafter set forth in the specification and claims and illustrated in the accompanying drawings, wherein:

Figure 1:
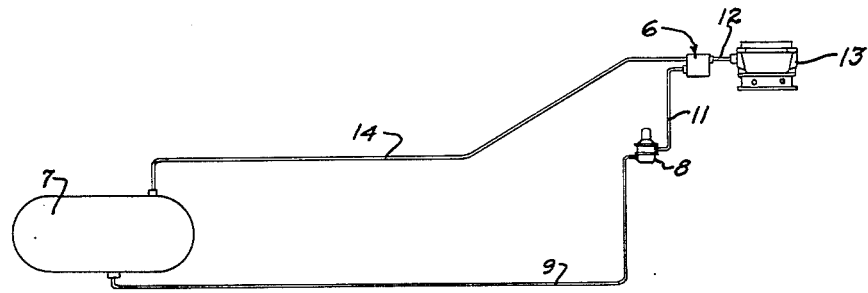
Fig. 1 is a schematic view illustrating an automobile fuel system having a filter device provided therein adapted to separate foreign particles and vapor gases from liquid fuel and to transfer such gases and/or some fuel back to the fuel tank, whereby bubble-free fuel is delivered from the filter device to the carburetor to insure efficient operation of the engine.

Referring now to the drawings for a better understanding of the invention and more particularly to Figs. 1 to 6 therein, a filter device, indicated generally at 6, is shown as incorporated in an automobile fuel system comprising a fuel tank 7 connected to the inlet side of a fuel pump 8 by a conduit 9. A conduit 11 leads from the pump outlet to the filter inlet, and a conduit 12 leads from the filter outlet to a carburetor 13. A return conduit 14 leads from the filter device 6 to the fuel tank 7.

Figures 2, 3:
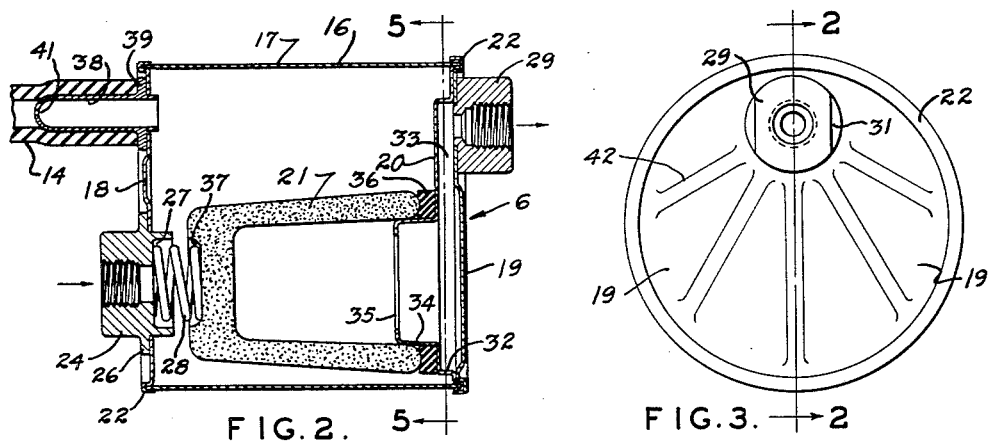
Fig. 2 is a longitudinal vertical sectional view, taken along the line 2—2 of Fig. 3, illustrating a filter device embodying features of the invention.
Fig. 3 is an end elevational view showing the outlet end of the filter device.
Figure 4:
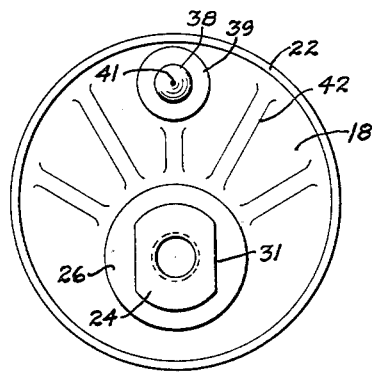
Fig. 4 is an end elevational view showing the inlet end of the filter device.
Figure 5:
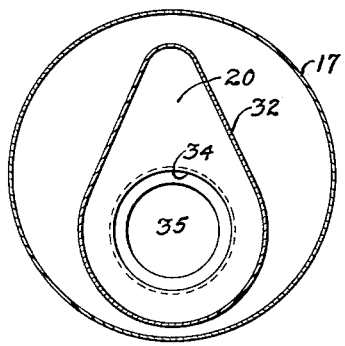
Fig. 5 is a transverse sectional view taken along the line 5—5 of Fig. 2.
Figure 6:
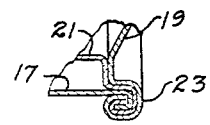
Fig. 6 is an enlarged fragmentary detail sectional view illustrating a conventional double lap tin can joint or seam for joining the marginal portions of the inner partition and adjacent end wall to one end of the tubular side wall.

The filter device 6 is shown as comprising a housing 16 having a cylindrical side wall 17 closed at its ends by end walls 18 and 19. An inner partition 20 is disposed against the inner side of the end wall 19 to provide a seat for the open end of a conventional cup-shaped ceramic filter element 21. To materially reduce the cost of manufacture, the housing 16 is shown as formed of thin sheet metal of tin can construction in which the marginal portions of the inner partition 20 and end walls 18 and 19 are crimped over the ends of the cylindrical side wall 17 to form either conventional single lap or double lap leakproof tin can joints or seams. Fig. 2 illustrates a conventional single lap seal 22, and Fig. 6 shows a conventional double lap seam 23.

To further decrease the cost of manufacture and assembly, the diameter and length of the housing 16 may correspond to a standard can size to permit the use of conventional machines now available for making the side walls 17 and for performing the seaming operations.

The end wall 18 is formed with an aperture to snugly receive the inner end of an inlet fitting 24 provided with a flange 26 for soldered or brazed leakproof engagement against the outer face of the end wall, the inner end of the fitting being formed with a cup-shaped spring seat 27 to receive one end of a compression spring 28. The other end wall 19 is also formed with an aperture to snugly receive an outlet fitting 29 which is soldered or brazed to the outer face of the end wall. The fittings 24 and 29 are internally threaded for detachable engagement with their respective conduits 11 and 12, and are also preferably formed with flat surfaces 31 engageable by a wrench when the filter device is being installed in or removed from the fuel line.

The partition 20 is offset inwardly at 32 from the end wall 19 to define therewith a fuel passage 33 converging upwardly toward and communicating with the port in the outlet fitting 29. An annular flange 34 defining an opening 35 extends inwardly from the partition offset portion 32 to form therewith a filter element seat coaxial with the spring seat 27 in the inlet fitting 24. A resilient ring gasket 36 is mounted on the filter seat for engagement by the annular rim portion of the cup-shaped filter element 21. The filter element 21 is recessed at 37 to provide a seat for the spring 28.

The end wall 18 is formed with an aperture to receive the inner end of a nipple 38 having a flange 39 soldered or brazed to the outer face of the end wall, the nipple having a restricted orifice 41 for the passage of gases and/or fuel from the filter housing into the gas transfer conduit 14 leading back to the fuel tank 7. The end walls 18 and 19 are formed with reinforcing beads 42 extending radially from their respective fittings 24 and 29 to resist outward bulging of the end walls due to internal pressure within the housing.

It will be noted that the filter element 21 occupies less than one-fourth of the space within the housing 16 and is offset from the longitudinal axis thereof to provide a relatively large space above the filter element to receive gases and/or liquid fuel to be transferred back to the tank through the nipple orifice 41 and conduit 14. For example, the housing 16 may have an inner diameter of 2½ inches, and the filter element 21 may have an outer diameter of approximately 1½ inches at its rim end. The vent orifice 41 may, for example, have a diameter of forty-five one-thousandths ($45/1000$) inch.

In the operation of the fuel system thus shown and described, fuel passes from the fuel tank 7 through conduit 9, fuel pump 8, and conduit 11 into the interior of the filter housing 16 and thence through the ceramic filter element 21, passage 33, and conduit 12 to the carburetor 13. When all of the fuel in the system is in a bubble-free liquid condition, a portion of the fuel within the filter housing 16 is transferred back to the fuel tank through the orifice 41 and return conduit 14.

When a conventional automobile fuel system is subjected to abnormally high operating temperatures, vapor gas bubbles may form in the fuel system between the pump and the carburetor, causing a vapor lock, back pressure on the pump, and a reduced flow of liquid fuel into and through the carburetor to the engine.

To prevent a vapor lock in a fuel system, the filter device 6 is interposed in the system to receive fuel from the pump and to separate the vapor gases therein from the liquid fuel. By providing a relatively large storage space within the filter housing 16 above the filter element 21 to receive vapor gases and liquid fuel, all of the vapor gases and a portion of the liquid fuel are forced through the restricted vent orifice 41 and thence through the conduit 14 back to the fuel tank, while the remainder of the liquid fuel is forced through the filter element 21 and conduit 12 into the carburetor.

It will be understood that vapor gases and foreign particles will not pass through the filter element 21 to the carburetor; and, further, that the pump is of sufficient capacity to permit transfer of some of the fuel back to the fuel tank and to also supply sufficient liquid fuel to the carburetor to meet the engine requirements.

Figure 10:
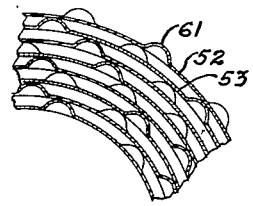
Fig. 10 is an enlarged transverse fragmentary sectional view taken along the line 10—10 of Fig. 8.
Figure 9:
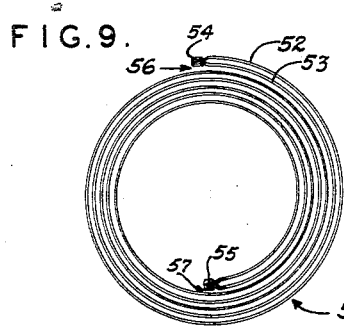
Fig. 9 is an end elevational view of the filter element, the end cap being removed to more clearly illustrate the construction.
Figure 8:
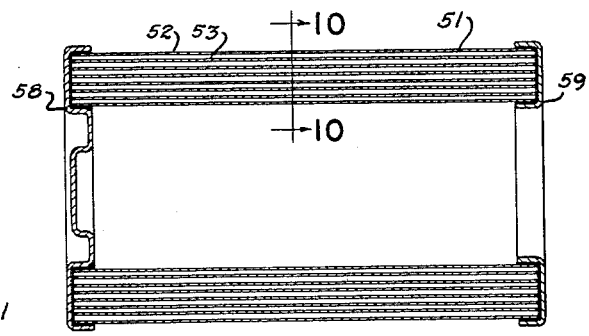
Fig. 8 is an enlarged longitudinal sectional view showing the modified form of filter element.

Figs. 7 to 10 illustrate a modified form of the invention in which a filter element 51 is shown as comprising two strips 52 and 53 of embossed sheet material, such as treated paper suitable for use as a gasoline filter medium, secured together at their ends by means such as metal clips 54 and 55 and spirally wound to define an inlet passage 56 and an outlet passage 57, the side edges of the strips being adhesively united to end caps 58 and 59. The strips 52 and 53, illustrated in Fig. 10, are formed throughout their length and width with dome-shaped embossments 61 spaced from each other and serving to space the body portions of the strips from each other during and after being spirally wound to form a filter element. In addition to serving as a spacing medium for the strips, the embossments also serve to increase the filter area of the strips.

Figure 7:
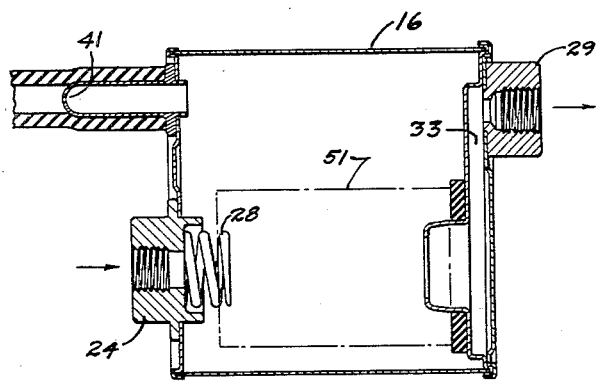
Fig. 7 is a longitudinal vertical sectional view illustrating a modified form of filter element mounted within the filter housing.

The filter element 51 is mounted within the filter housing 16, as illustrated in Fig. 7, with its end cap 59 engaged against the sealing gasket 36 and its other end cap 58 engaged by the compression spring 28. When thus positioned, fuel passes into the the inlet passage 56 which is closed at its end by the clip 55 and must, therefore, pass through the filter strips into the outlet passage 57 leading to the fuel passage 33 and conduit 12 to the carburetor.

Figure 11:
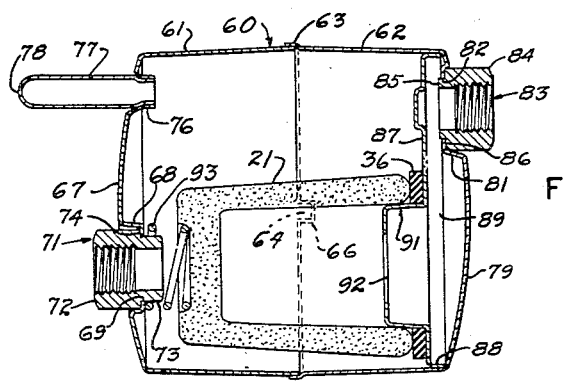
Fig. 11 is a vertical sectional view illustrating another embodiment of the invention.

Fig. 11 illustrates another embodiment of the invention in which the filter device is shown as comprising a housing 60 formed by two cup-shaped sections 61 and 62 having their rim portions in telescopic engagement at 63 and soldered together to provide a leakproof joint therebetween. The section 61 is provided with a tongue 64 seated in a socket 66 formed in the section 62.

The end wall 67 of the housing section 61 is formed with a hexagonal socket 68 and an aperture 69 to receive an internally threaded inlet fitting 71 formed with a hexagonal body portion 72 and a cylindrical end portion 73 disposed within the socket and aperture, respectively. The fitting is thus provided with an annular abutment surface which is soldered at 74 to a complementary annular surface on the end wall 67. The end wall 67 is also formed with an opening defined by a flange 76 to receive a nipple 77 having a restricted vent aperture 78, the nipple being soldered to the flange to provide a leakproof connection therebetween.

The end wall 79 of the housing section 62 is also formed with a hexagonal socket 81 and an aperture 82 to receive an internally threaded outlet fitting 83 formed with a hexagonal body portion 84 and a cylindrical end portion 85 disposed within the socket and aperture, respectively. The outlet fitting thus provides an annular abutment surface adapted to be soldered at 86 to a complementary surface on the end wall 79.

An inner partition 87 is formed with a peripheral flange 88 adapted to be soldered in fixed position within and to the housing section 62 adjacent the end wall 79 to define therewith a passage 89. The partition is formed with a cylindrical offset portion 91 having an apertured inner wall 92 for the flow of fluid into the passage 89. A ring gasket is mounted on the offset portion 91 to engage the rim end of a conventional cup-shaped ceramic filter element 21 which is urged against the gasket by a compression spring 93 mounted on the inner portion 73 of the inlet fitting 71.

Certain structures have been described herein which will fulfill all the objects of the present invention, but it is contemplated that other modifications will be obvious to those skilled in the art which come within the scope of the invention as defined by the appended claims.

I claim:

1. A filter device for a fuel system having a fuel pump to transfer liquid fuel from a fuel tank to a carburetor, said filter device adapted to be interposed in the system between the pump and carburetor, said filter device comprising a housing normally filled with fuel and having an inlet and outlet, a fuel filter element in said housing extending across said outlet to prevent the passage of solid foreign particles and vapor gases therethrough to the carburetor, said housing having a fuel chamber between said inlet and filter element, and an open return conduit fixed to said housing to provide a permanently open passage from said fuel chamber and adapted to lead to the fuel tank for the continuous flow of vapor gas and liquid fuel from the chamber during operation of the fuel pump, said return conduit having a small orifice restricting the flow of vapor gases and liquid fuel from said chamber to the fuel tank.

2. A filter device for separating solid foreign particles and vapor gases from liquid fuel comprising a cylindrical portion, a first circular plate closing one end of said cylindrical portion, and a second and third circular plate fitted together at their peripheries and closing the other end of said cylindrical portion, one of said second and third circular plates having an offset portion defining a fluid passageway between said second and third plates, the inner one of said second and third plates having an aperture therethrough into said passageway, an outlet fitting in the outer one of said second and third plates providing an outlet for said passageway, an inlet fitting fixed through said first plate opposite said aperture, said first plate having a restricted vent orifice for discharging collected vapors, a filter cup seated against the inner one of said second and third plates and around said aperture and extending between said inlet fitting and said aperture, and a coil spring compressed between said first circular plate and said filter cup.

3. A filter device for separating solid foreign particles and vapor gases from liquid fuel comprising a cylindrical portion, a first circular plate closing one end of said cylindrical portion, and a second and third circular plate fitted together at their peripheries and closing the other end of said cylindrical portion, one of said second and third circular plates having an offset portion defining a fluid passageway between said second and third plates, the inner one of said second and third plates having an aperture therethrough into said passageway, an outlet fitting in the outer one of said second and third plates providing an outlet for said passageway, an inlet fitting fixed through said first plate opposite said aperture, said cylindrical portion and said circular plates being formed of sheet metal and permanently secured together along their marginal portions by lap seam joints, a filter cup seated around said aperture and extending between said inlet fitting and said aperture, and a coil spring compressed between said first circular plate and said filter cup, said first plate having a restricted vent orifice.

References Cited in the file of this patent

UNITED STATES PATENTS

| | | |
|---|---|---|
| 2,097,492 | Lang | Nov. 2, 1937 |
| 2,129,697 | Louisot | Sept. 13, 1938 |
| 2,414,158 | Mock | Jan. 14, 1947 |
| 2,427,733 | McCann | Sept. 23, 1947 |
| 2,512,797 | Harvuot | June 27, 1950 |
| 2,537,898 | Hunter et al. | Jan. 9, 1951 |
| 2,554,016 | Czarnecki | May 22, 1951 |
| 2,588,519 | Guiot | Mar. 11, 1952 |
| 2,599,604 | Bauer et al. | June 10, 1952 |
| 2,693,281 | Winzen | Nov. 2, 1954 |
| 2,834,469 | Mitterer | May 13, 1958 |

FOREIGN PATENTS

| | | |
|---|---|---|
| 699,168 | Great Britain | Oct. 28, 1953 |
| 820,834 | France | Nov. 19, 1937 |
| 1,110,242 | France | Feb. 9, 1956 |
| 846,245 | Germany | Aug. 11, 1952 |